3,264,299
QUINACRIDONE PIGMENT PROCESS
Daniel W. Thomas and William L. Berry, Somerville, N.J., assignors to American Cyanamid Company, New York, N.Y., a corporation of Maine
No Drawing. Filed Feb. 27, 1962, Ser. No. 176,089
7 Claims. (Cl. 260—279)

This invention relates to an improved process for preparing a quinacridone pigment and more particularly to an improved process for the preparation of the yellow shade crystalline form of 2,9-dimethylquinacridone represented by the chemical Formula I:

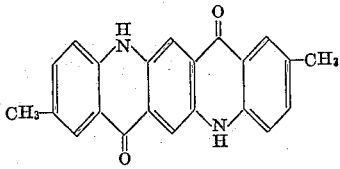

Until recently, 2,9-dimethylquinacridone had only been known as a crude solid material, substantially useless for pigmentary purposes. It was then discovered that 2,9-dimethylquinacridone could be obtained in two substantially pure and distinct crystalline forms, each of which had excellent color and shade qualities suitable in normal pigmentary applications. These distinct crystalline forms are fully disclosed in copending application for U.S. Letters Patent Serial No. 175,816, filed February 26, 1962, by William L. Berry, one of the present inventors, jointly with James J. Kelly.

The crystalline forms have different physical properties by which they may be distinguished. One difference is the shade of the visual red color of each. One has a blue shade and is referred to as the blue shade pigment, and the other has a yellower shade and is referred to as the yellow shade pigment. The yellow and blue shade pigments also differ in their diffraction patterns when irradiated with CuK alpha X-rays. This is shown in Table I giving the angle of diffraction (converted to interplanar spacings expressed in Angstrom units) and the intensity (expressed as a percentage of the intensity of the strongest line) of the diffraction rays.

TABLE I

| Yellow Shade Pigment | | Blue Shade Pigment | |
|---|---|---|---|
| Interplanar Spacings (A.) | Intensity (Percent) | Interplanar Spacings (A.) | Intensity |
| 16.0 | (100) | 17.2 | (100) |
| 3.35 | 67 | 3.34 | 73 |
| 6.43 | 55 | 6.39 | 53 |
| 3.51 | 21 | 8.3 | 30 |
| 8.0 | 24 | | |
| 3.74 | 17 | | |
| 3.97 | 14 | | |

The yellow shade pigment is also distinguished from its counterpart by better stability at high temperatures and in solvents.

By reason of these enumerated differences for a given use, it may be more desirable to use one pigment than the other. For example, where the end use of the pigment is in a coating which may be subjected to high temperatures, the yellow shade pigment would be the pigment of choice. Likewise, need for a blue shade red coating could not be satisfied by use of the yellow shade pigment. Depending on the contemplated end use, it is sometimes desirable to employ one pigment and other times, the other pigment.

Prior to the present invention, the blue shade pigment was obtainable as the direct ring closure product of 2,5-di-p-toluidinoterephthalic acid (as well as alkyl esters thereof) using as the ring closing agent polyphosphoric acid, and the like.

As for the yellow shade pigment, there was no known method by which it could be prepared directly from 2,5-di-p-toluidinoterephthalic acid. It was necessary to first prepare the blue shade pigment which had then to be refluxed in an organic solvent for an extended period. Then only was the desired yellow shade pigment obtained. The more involved procedure which had to be followed in order to obtain the yellow shade pigment raised its cost as compared to the blue shade pigment. This was obviously undesirable, and it was an object of this invention, therefore, to provide an improved method for obtaining the yellow shade pigment. More particularly it was an object of this invention to provide an efficient and economical method by which the yellow shade pigment could be independently prepared directly from the same starting material used in preparing the blue shade pigment.

These and other objects were accomplished by this invention in a surprisingly simple manner. In accordance therewith, it was discovered that if the ring closing of 2,5-di-p-toluidinoterephthalic acid is carried out at a temperature between about 175° and 220° C., using a benzenesulfonic acid catalyst and a chlorinated benzene solvent, the yellow shade pigment is obtained in high yields to the substantial exclusion of the blue shade pigment.

In carrying out the process of this invention, the starting material may be employed either in its acid form or as an alkyl, preferably a di-lower alkyl (having the same or different alkyl (groups) ester. Of the latter, the dimethyl and the diethyl 2,5-di-p-toluidinoterephthalates are preferred. This is added to the chlorobenzene solvent and maintained along with the benzenesulfonic acid catalyst at an elevated temperature for a sufficient time to allow formation of the solid product. In a preferred embodiment the terephthalate-chlorobenzene mixture may be brought to reaction temperature before contact with the sulfonic acid catalyst. The solid product is the desired yellow shade pigment which may be isolated by filtration and washed if desired with an organic solvent, before conditioning for pigment use.

The chlorinated benzene solvents which are employed herein are those which are liquid at ambient temperatures. Included in this category are monochlorobenzene, o-, and m-dichlorobenzene and the isomeric variations of trichlorobenzene as well as their lower alkyl derivatives. It is noteworthy that trichlorobenzenes are the most preferred since they surprisingly allow excellent yield of product when only small amounts of sulfonic acid catalyst are employed. In general, an excess of solvent should be used, even up to twenty parts by weight of solvent per every part of terephthalate. For most efficient operation, between five and ten parts of solvent per part of terephthalate should be used since less results in significantly lowered yields, and more is uneconomical. Optimum results are obtained when about 7.5 parts of solvent per part of terephthalate are employed.

Benzenesulfonic acids which are suitable for use in the claimed process are those which are either unsubstituted or substituted by lower alkyl groups. They may be used in the form of the mono-hydrate. Among the useful acids are benzenesulfonic acid, o-, m- and p-toluenesulfonic acids and o-, m-, and p-ethylbenzenesulfonic acid as well as monohydrates thereof. The amount of acid employed based on the weight of the terephthalic starting material is not critical. However, with very small amounts, the time necessary for reaction becomes longer. Therefore, for practical purposes between about 0.2 and 1.5 parts, or preferably between 0.4 and 0.6 part of catalyst for each part by weight of terephthalate should be employed.

Reaction temperatures must be above 175° C. to obtain varying the solvent ratio of solvent to ester and acid catalyst to ester along with reaction time. Results of variations in such runs are shown in the table below.

| No. | Grams of Ester | Solvent | C. C. of Solvent | Catalyst | Grams of Catalyst | Temp. (° C.) | Time of Heating (hrs.) | Yield (percent) |
|---|---|---|---|---|---|---|---|---|
| 1 | 10 | TCB [1] | 75 | p-TSA [2] | 8 | 212 | 2.5 | 71.3 |
| 2 | 35 | TCB | 265 | p-TSA | 17.5 | 210 | 2.5 | 77.9 |
| 3 | 10 | ODCB [3] | 75 | p-TSA | 8 | 180 | 5 | 67.5 |
| 4 | 10 | TCB | 75 | p-TSA monohydrate | 5 | 212 | 3 | 77.7 |
| 5 | 10 | TCB | 75 | ....do.... | 5 | 212 | 4 | 76.1 |
| 6 | 10 | TCB | 75 | Benzene-sulfonic acid monohydrate. | 4.5 | 210 | 3 | 65.6 |

[1] TCB is predominately 1,2,4-trichlorobenzene.
[2] TSA is toluenesulfonic acid.
[3] ODCB is predominantly ortho-dichlorobenzene.

good yields in reasonably short reaction times. Below this temperature, heating periods must be increased and this occasionally results in degradation of the product. For best results the reaction temperature should be between about 200° C. and 215° C., with the higher part of the range being most preferred.

The yellow shade pigment obtained by the foregoing procedure, depending on the purity of the starting materials, may be directly conditioned for pigment use by conventional grinding procedures, or it may be first washed with a solvent such as dimethylformamide, and then conditioned.

The following examples are presented for purposes of further illustrating the present invention.

*Example 1*

To 291 g. of the mixed methyl ethyl ester of 2,5-di-p-toluidinoterephthalate is added 2180 ml. of 1,2,4-trichlorobenzene. The mixture is heated to 205° C. and 145 g. of p-toluene sulfonic acid is added very slowly. The mixture is then heated with stirring for three hours at about 213° C. The solid yellow shade pigment which forms is removed by hot filtration and washed with hot trichlorobenzene. After a further washing with hot dimethyl formamide or hot alcohol, substantially pure pigment product is obtained in 73.3% yield.

Similar results are obtained when the corresponding dimethyl ester of 2,5-di-p-toluidinoterephthalic acid are employed in the foregoing procedure.

*Example 2*

A number of preparations were carried out using a procedure similar to that described in Example 1 but

We claim:
1. An improved process of preparing the yellow shade crystalline form of 2,9-dimethylquinacridone which comprises treating about one part by weight of a member selected from the group consisting of the di-lower alkyl esters of 2,5-di-p-toluidinoterephthalic acid with from 0.2 to 1.5 parts by weight of a benzene sulfonic acid catalyst in at least 5 parts by weight of a liquid chlorinated benzene solvent at a temperature between about 175° and 220° C. and separating the yellow shade red pigment thus formed.

2. The process of claim 1 wherein the chlorinated benzene solvent is 1,2,4-trichlorobenzene.

3. The process of claim 1 wherein the temperature is between about 200° and 212° C.

4. The process of claim 1 wherein the benzene sulfonic catalyst is p-toluenesulfonic acid.

5. The process of claim 1 wherein 0.5 part by weight of the benzene sulfonic acid per part of the terephthalic acid derivative is employed.

6. The process of claim 1 wherein from 5 to 10 parts of the solvent are employed per each part of the terephthalic acid derivative.

7. An improved process for the preparation of the yellow shade crystalline form of 2,9-dimethylquinacridone which comprises treating one part by weight of a mixed methyl, ethyl ester of 2,5-di-p-toluidinoterephthalic acid with about 0.5 part by weight of p-toluenesulfonic acid in from 5 to 10 parts by weight of a trichlorobenzene at a temperature between about 200° and 212° C. and separating the yellow shade pigment thus formed.

References Cited by the Examiner

UNITED STATES PATENTS 3,016,384   1/1962   Caleizi _____ 260—279 X

FOREIGN PATENTS 1,226,260   2/1960   France.
1,233,785   5/1960   France.

OTHER REFERENCES

Fieser et al., Organic Chemistry, 3rd Edition, pages 588–9 (1956).

Scholl et al., Ber. Deut. Chem., vol. 44, pp. 1075–1090; page 1079 relied on (1911).

HENRY R. JILES, *Acting Primary Examiner.*

D. M. McCUTCHEN, JOHN D. RANDOLPH, WALTER MODANCE, *Examiners.*

D. M. KERR, DONALD DAUS, *Assistant Examiners.*